United States Patent [19]
MacDonald et al.

[11] Patent Number: 5,893,616
[45] Date of Patent: Apr. 13, 1999

[54] KNOCK-DOWN HANG-ON STORAGE UNIT FOR PORTABLE PARTITION SYSTEMS

[75] Inventors: Douglas B. MacDonald, Caledonia; James L. Stickland, Grandville, both of Mich.

[73] Assignee: Steelcase, Inc., Grand Rapids, Mich.

[21] Appl. No.: 08/856,994

[22] Filed: May 15, 1997

[51] Int. Cl.⁶ .................................................. A47B 47/00
[52] U.S. Cl. ............................ 312/245; 312/247; 312/263; 312/265.5; 312/323; 403/319
[58] Field of Search ............................ 52/36.4, 36.5, 52/36.6; 312/245, 247, 257.1, 263, 265.5, 265.6, 139.1, 323, 195; 49/253, 260, 255, 254; 403/315, 319, 316, 329; 108/108, 107, 106; 248/222.11

[56] References Cited

U.S. PATENT DOCUMENTS

| | | |
|---|---|---|
| 3,010,585 | 11/1961 | Slikkers ............................ 108/107 X |
| 3,065,038 | 11/1962 | Pipe . |
| 3,101,226 | 8/1963 | Cochran, Jr. ...................... 312/265.5 |
| 3,601,432 | 8/1971 | Fenwick . |
| 3,697,034 | 10/1972 | Shell . |
| 3,733,651 | 5/1973 | McKay . |
| 3,771,847 | 11/1973 | Aylworth . |
| 3,886,698 | 6/1975 | Raith et al. . |
| 3,965,826 | 6/1976 | Markham . |
| 4,018,019 | 4/1977 | Raith et al. . |
| 4,123,879 | 11/1978 | Blodee et al. . |
| 4,154,419 | 5/1979 | Breidenbach . |
| 4,157,228 | 6/1979 | Hammerschlag . |
| 4,171,789 | 10/1979 | Vander Hoek et al. . |
| 4,222,542 | 9/1980 | Wilson et al. . |
| 4,265,500 | 5/1981 | Berton et al. . |
| 4,265,502 | 5/1981 | Blodee et al. ...................... 312/245 X |
| 4,341,486 | 7/1982 | Hammerschlag . |
| 4,387,872 | 6/1983 | Hogue . |
| 4,404,776 | 9/1983 | Ball et al. . |
| 4,541,599 | 9/1985 | Schoumaker . |
| 4,550,893 | 11/1985 | Wiersema et al. . |
| 4,591,214 | 5/1986 | Reuter et al. ...................... 312/110 |
| 4,615,570 | 10/1986 | Goodman ........................ 312/323 X |
| 4,700,916 | 10/1987 | Bastian et al. . |
| 4,733,841 | 3/1988 | Wilson ............................ 312/245 X |
| 4,799,436 | 1/1989 | Goodman ........................ 312/247 X |
| 4,815,797 | 3/1989 | Haab et al. . |
| 4,971,281 | 11/1990 | Steinbeck . |
| 5,063,715 | 11/1991 | Goodman . |
| 5,121,976 | 6/1992 | Haab et al. . |
| 5,149,180 | 9/1992 | Haab et al. ...................... 49/254 X |
| 5,335,987 | 8/1994 | Hodge et al. ...................... 312/323 |
| 5,399,010 | 3/1995 | McClung et al. . |
| 5,433,327 | 7/1995 | Benvenuti et al. . |
| 5,494,246 | 2/1996 | McCarthy et al. . |
| 5,535,972 | 7/1996 | Fallago . |
| 5,538,213 | 7/1996 | Brown . |

FOREIGN PATENT DOCUMENTS

| | | | |
|---|---|---|---|
| 2387003 | 12/1978 | France ............................ 312/265.5 |
| 49242 | 9/1940 | Netherlands ..................... 108/106 |
| 1599950 | 10/1981 | United Kingdom . |

Primary Examiner—Peter M. Cuomo
Assistant Examiner—Janet M. Wilkens
Attorney, Agent, or Firm—Price, Heneveld, Cooper, DeWitt & Litton

[57] ABSTRACT

A knock-down hang-on storage unit for portable partition systems includes first and second end members with shelf support flanges having inwardly protruding horizontal support legs and vertical support legs that define narrow vertical slots. Forward edges of the end members have rearwardly opening notches that capture the forward edge of a shelf that extends horizontally between the end members. The shelf includes first and second depending attachment flanges along opposite sides thereof that are inserted into the slots. The rear portion of the shelf is supported on the horizontal support legs adjacent upstanding tabs on the shelf support brackets to horizontally capture the shelf member between the end members and provide a fastenerless interconnection therebetween.

47 Claims, 8 Drawing Sheets

KNOCK-DOWN HANG-ON STORAGE UNIT FOR PORTABLE PARTITION SYSTEMS

BACKGROUND OF THE INVENTION

The present invention relates to a storage unit for portable partition systems and the like, and in particular to a knock-down hang-on storage unit that may be quickly and easily assembled for installation on a partition, and also may be removed from the partition in an assembled condition.

The efficient use of building floor space is an ever-growing concern, particularly as building costs continue to escalate. Open office plans have been developed to reduce overall officing costs and generally incorporate large, open floor spaces in buildings that are equipped with modular furniture systems which are readily reconfigurable to accommodate the ever-changing needs of a specific user, as well as the divergent requirements of different tenants. One arrangement used for furnishing open plans includes movable or portable partition panels that are detachably interconnected to partition off the open spaces into individual work stations and/or offices. Such partition panels are configured to receive hang-on accessory units, such as overhead cabinets, shelves, and similar storage units.

Numerous overhead cabinets, shelves, and related storage units have been developed for use with partition panel systems. Although these storage units generally serve their intended function of providing storage areas for books, files, and similar items, these storage units are fabricated and shipped as an assembled unit, thereby requiring additional cargo space during shipping. Other storage units have been developed that may be disassembled; however, these storage units are not removable in an assembled condition and must be disassembled for removal from an associated partition.

Thus, there is a need for a storage unit that may be shipped in a disassembled condition and quickly and easily assembled on site. In addition, there is a need for a knock-down hang-on storage unit that may be removed from an associated panel in an assembled condition for ease of subsequent relocation.

SUMMARY OF THE INVENTION

One aspect of the present invention is a knock-down hang-on storage unit for portable partition systems and the like including first and second members configured to be detachably mounted on an associated partition in a laterally spaced-apart relationship to define opposite side walls of the storage unit. The first and second end members include shelf support flanges extending along interior sides thereof, and having inwardly protruding horizontal support legs extending along at least a portion of the end member interior sides to upstanding tabs adjacent rear areas of the horizontal support legs. Vertical support legs extend along at least a portion of the end member interior sides and define narrow vertical slots therebetween. The first and second end members also include formed forward edges extending generally vertically along at least a portion thereof with rearwardly opening notches disposed adjacent lower portions of the forward edges. A shelf member extends generally horizontally between the first and second end members to define a bottom wall of the storage unit. The shelf member includes an upstanding rear portion, a formed front edge extending along the forward portion of the shelf member, and first and second depending attachment flanges extending along opposite sides thereof. The shelf member is shaped to be closely received between the end members, and is configured such that during assembly of the storage unit, the attachment flanges are inserted into the slots, whereby forward shifting of the shelf member positions the forward edge of the shelf member in the notches of the end member forward edges to vertically capture the forward portion of the shelf member. Downwardly shifting of the rear portion of the shelf member positions the opposite sides of the shelf member into abutting support on the horizontal support legs and locates the upstanding rear portion thereof immediately adjacent the upstanding tabs on the shelf support brackets to horizontally capture the shelf member between the end members and thereby provide a fastenerless interconnection therebetween.

Another aspect of the present invention is a knock-down hang-on storage unit for portable partition systems and the like including first and second end members configured to be detachably mounted on an associated partition in a laterally spaced-apart relationship to define opposite side walls of the storage unit. The first and second end members include inwardly protruding cover support flanges extending generally horizontally along at least a portion thereof with front clasp members and rear clasp members disposed adjacent opposite ends of the support flanges. A shelf member extends generally horizontally between the first and second end members along lower portions thereof to define a bottom wall of the storage unit. A cover member extends generally horizontally between the first and second end members along upper portions thereof to define an upper wall of the storage unit. The cover member includes a forwardly projecting flange extending along the rear portion of the cover member, and a rearwardly projecting flange extending along the forward portion of the cover member. The cover member is shaped to be closely received between the end members, and is configured such that during assembly of the storage unit, rearward shifting of the cover member with opposite sides thereof abuttingly supported on the cover support flanges causes the rear flange to engage the rear clasp members on the end members to vertically capture the rear portion of the cover member. Rearward shifting of the cover member also shifts the forward flange of the cover member into engagement with the front clasp members on the end members to vertically capture the forward portion of the cover member and thereby provide a fastenerless interconnection therebetween.

Yet another aspect of the present invention is a knock-down hang-on storage unit for portable partition systems and the like including first and second end members configured to be detachably mounted on an associated partition in a laterally spaced-apart relationship to define opposite side walls of the storage unit. The first and second end members include shelf support brackets attached to and extending along interior sides thereof, and have inwardly protruding horizontal support legs extending along at least a portion of the end member interior sides to upstanding tabs adjacent rear areas of the horizontal support legs, and vertical support legs extending along at least a portion of the end member interior sides and defining narrow vertical slots therebetween. The first and second end members also include formed forward edges extending generally vertically along at least a portion thereof with rearwardly opening notches disposed adjacent lower portions of the forward edges. A shelf member extends generally horizontally between the first and second end members to define a bottom wall of the storage unit. The shelf member includes an upstanding rear portion, a formed front edge extending along a forward portion of the shelf member, and first and second depending attachment flanges extending along opposite sides thereof. A cover member extends generally horizontally between the first and second end members along upper portions thereof to define an upper wall of the storage unit. The cover member includes a forwardly projecting flange extending along a rear portion of the cover member, and a rearwardly projecting flange extending along the forward portion of the cover member. The shelf member is shaped to be closely received between the end members, and is configured such that during assembly of the storage unit, the attachment flanges are inserted into the slots, whereby forward shifting of the shelf member positions the forward edge of the shelf member in the notches of the end member forward edges to vertically capture the forward portion of the shelf member. Downward shifting of the rear portion of the shelf member positions the opposite sides of the shelf member into abutting support on the horizontal support legs, and locates the upstanding rear portion thereof immediately adjacent the upstanding tabs on the shelf support brackets to horizontally capture the shelf member between the end members. The cover member is shaped to be closely received between the end members, and is configured such that during assembly of the storage unit, rearward shifting of the cover member with opposite sides thereof abuttingly supported on the cover support flanges causes the rear flange to engage the rear clasp members on the end members to vertically capture the rear portion of the cover member, and also shifts the forward flange of the cover member into engagement with the front clasp members on the end members to vertically capture the forward portion of the cover member and thereby provide the storage unit with a fastenerless construction.

Yet another aspect of the present invention is in a portable partition system of the type having rigid, slotted vertical uprights configured to support hang-on accessories thereon, the improvement of a knock-down storage unit including first and second end members with rearwardly protruding hooks configured to be received within the slotted uprights to detachably mount the end members on an associated partition in a laterally spaced-apart relationship to define opposite side walls of the storage unit. A shelf member extends generally horizontally between the first and second end members along the lower portions thereof to define a bottom wall of the storage unit. A cover member extends generally horizontally between the first and second end members along upper portions thereof to define an upper wall of the storage unit. Connectors detachably connect the shelf member and the cover member with the end members by sliding engagement therebetween to form a rigid construction for the storage unit which can be moved from a selected one of the slotted vertical uprights and remounted on different ones of the slotted vertical uprights without disassembling the storage unit.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
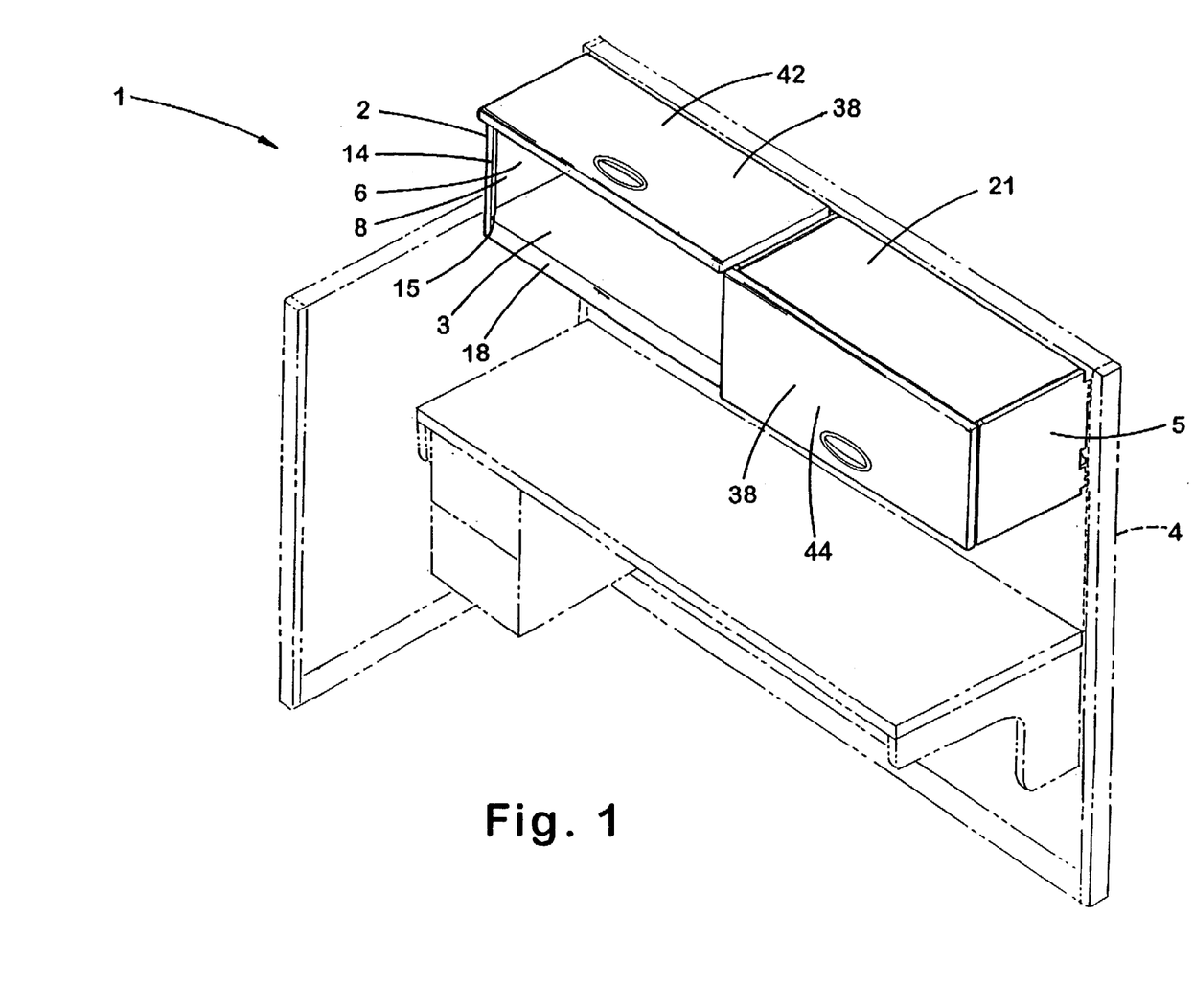
FIG. 1 is a perspective view of the knock-down hang-on storage unit of the present invention comprising a binder bin.
Figure 2:
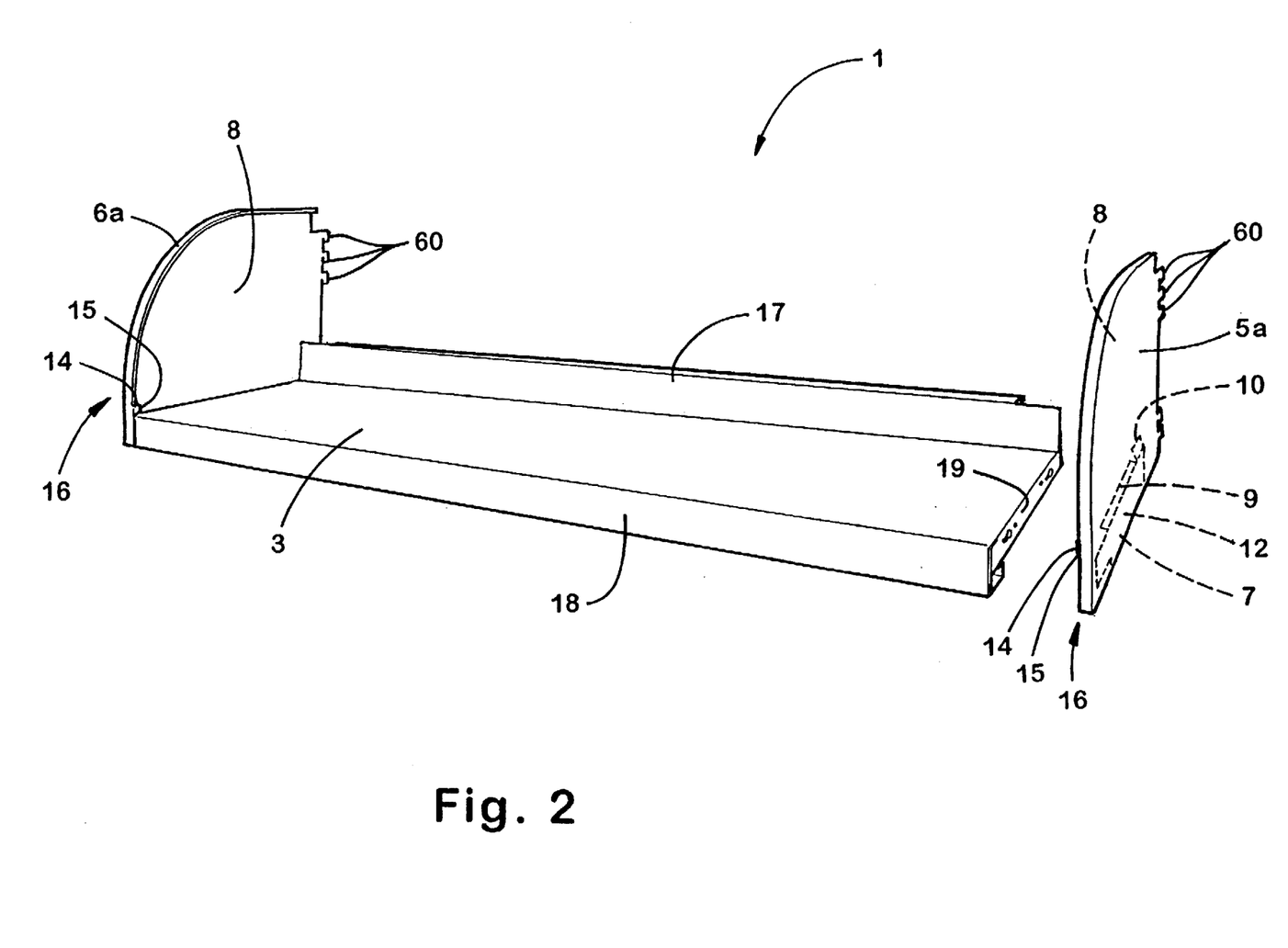
FIG. 2 is a partially exploded perspective view of the knock-down hang-on storage unit of the present invention comprising a shelf.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figures 4, 7:
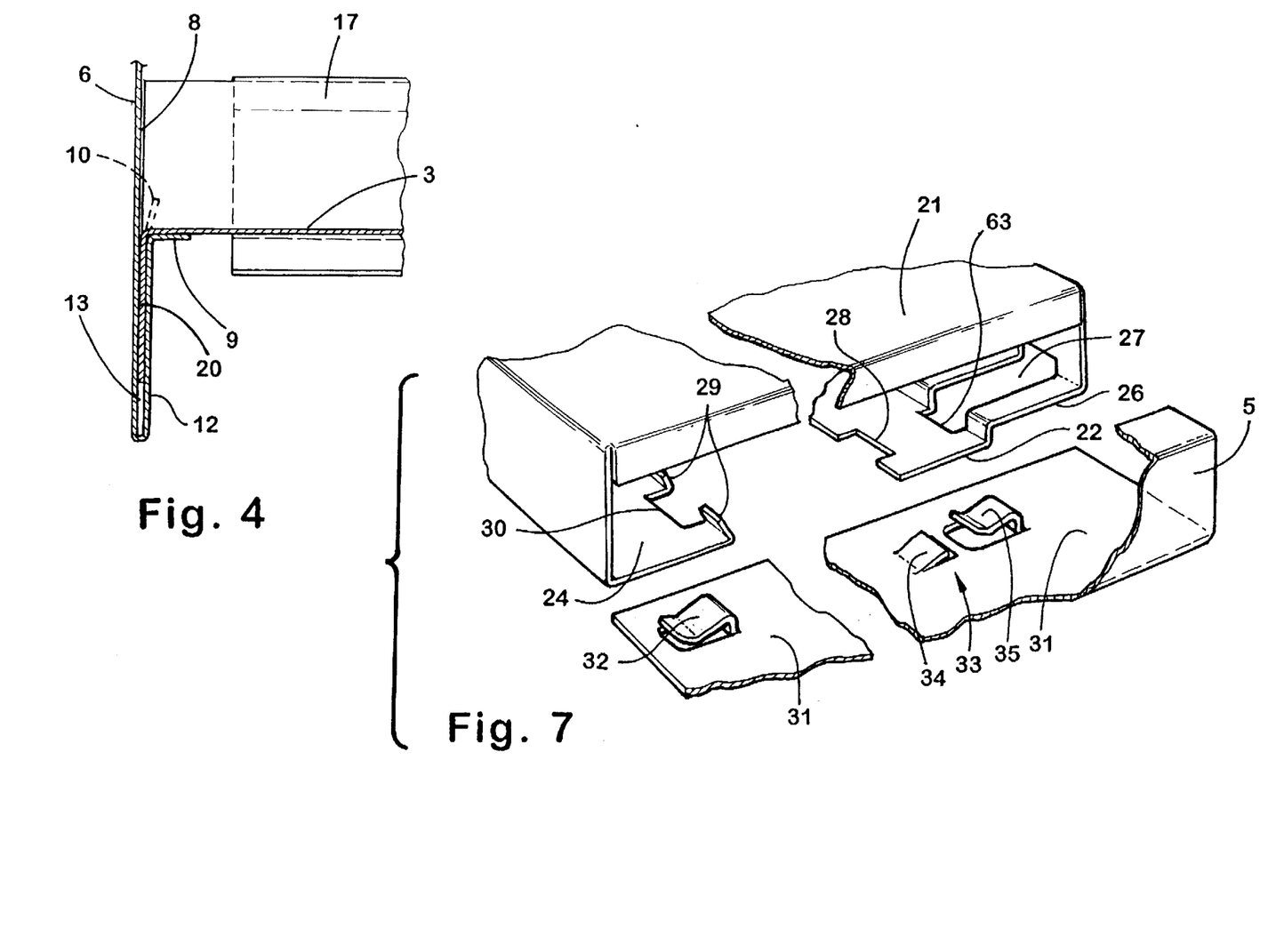
FIG. 4 is a fragmentary, front elevational view of the storage unit showing the shelf attachment flange and the shelf support flange.
FIG. 7 is an exploded, fragmentary, perspective view showing the front and rear clasps.
Figure 5:
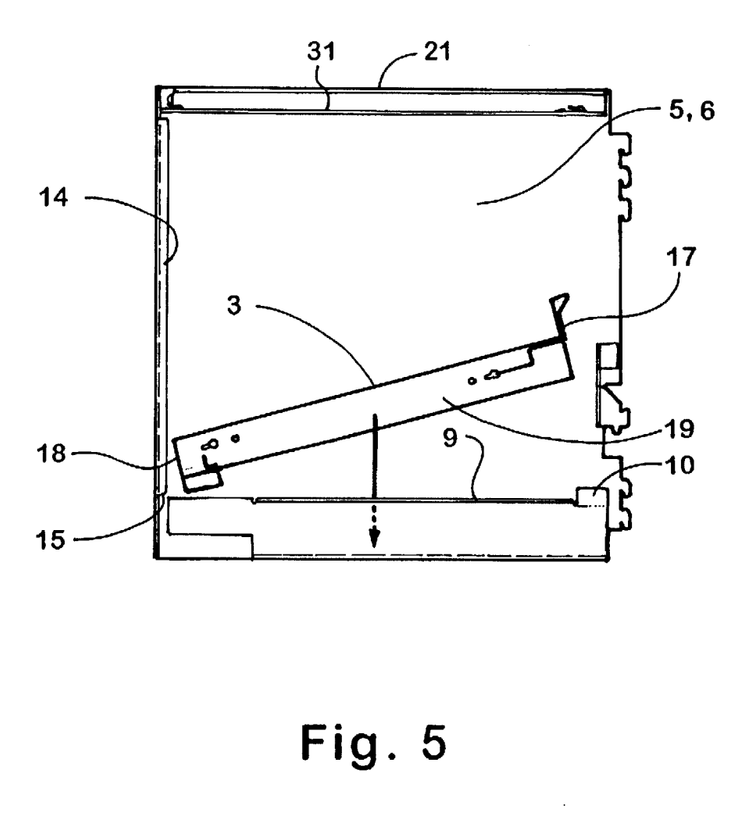
FIG. 5 is a side elevational view of the binder bin showing the shelf during assembly of the storage unit.
Figure 6:
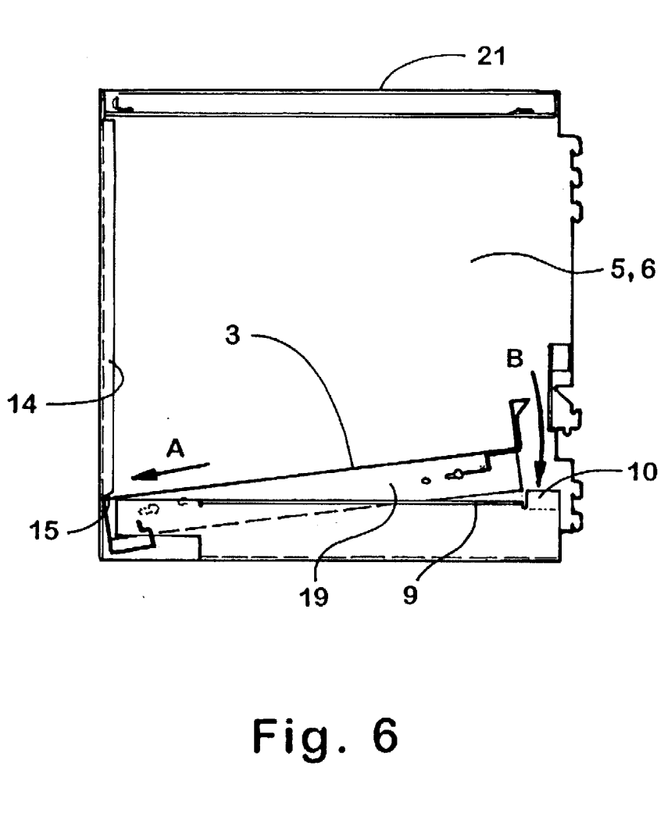
FIG. 6 is a side elevational view of the binder bin showing the shelf during assembly of the storage unit.

The reference numeral 1 (FIGS. 1, 2) generally designates a knock-down hangon storage unit for portable partition systems and the like embodying the present invention. In the illustrated examples, the storage unit of the present invention may comprise a binder bin 2 (FIGS. 1, 3) or a shelf 3 (FIG. 2). The knock-down hang-on storage unit 1 has first and second end members 5, 6 or 5a, 6a (FIG. 2) configured to be detachably mounted on an associated partition 4 in a laterally spaced-apart relationship to define opposite side walls of the storage unit 1. The first and second end members 5, 6 include shelf support flanges 7 (FIG. 3) extending along interior sides 8 thereof, and having inwardly protruding horizontal support legs 9 extending along at least a portion of the end member interior sides 8 to upstanding tabs 10 adjacent rear areas 11 of the horizontal support legs 9. Vertical support legs 12 extend along at least a portion of the end member interior sides 8 and define narrow vertical slots 13 therebetween (FIG. 4). The first and second end members 5, 6 also include formed forward edges 14 extending generally vertically along at least a portion thereof with rearwardly opening notches 15 disposed adjacent lower portions 16 of the forward edges 14. A shelf member 3 extends generally horizontally between the first and second end members 5, 6 to define a bottom wall of the storage unit 1. The shelf member 3 includes an upstanding rear portion 17, a formed front edge 18 extending-along a forward portion of the shelf member 3, and first and second depending attachment flanges 19, 20 extending along opposite sides thereof. The shelf member 3 is shaped to be closely received between the end members 5 and 6, and is configured such that during assembly of the storage unit 1, the attachment flanges 19, 20 are inserted into the vertical slots 13 (FIGS. 4–6). Forward shifting of the shelf member in the direction of the arrow "A" illustrated in FIG. 6 positions the forward edge 18 of the shelf member 3 in the notches 15 of the end member forward edges 14 to vertically capture the forward portion of the shelf member 3. As illustrated in FIG. 6, downward shifting of the rear portion of the shelf member 3 in the direction indicated by the arrow "B" positions the opposite sides of the shelf member 3 into abutting support on the horizontal support legs 9, and locates the upstanding rear portion 17 thereof immediately adjacent the upstanding tabs 10 on the shelf support brackets 7 to horizontally capture the shelf member 3 between the end members 5, 6 and thereby provide a fastenerless interconnection therebetween.

Figure 3:
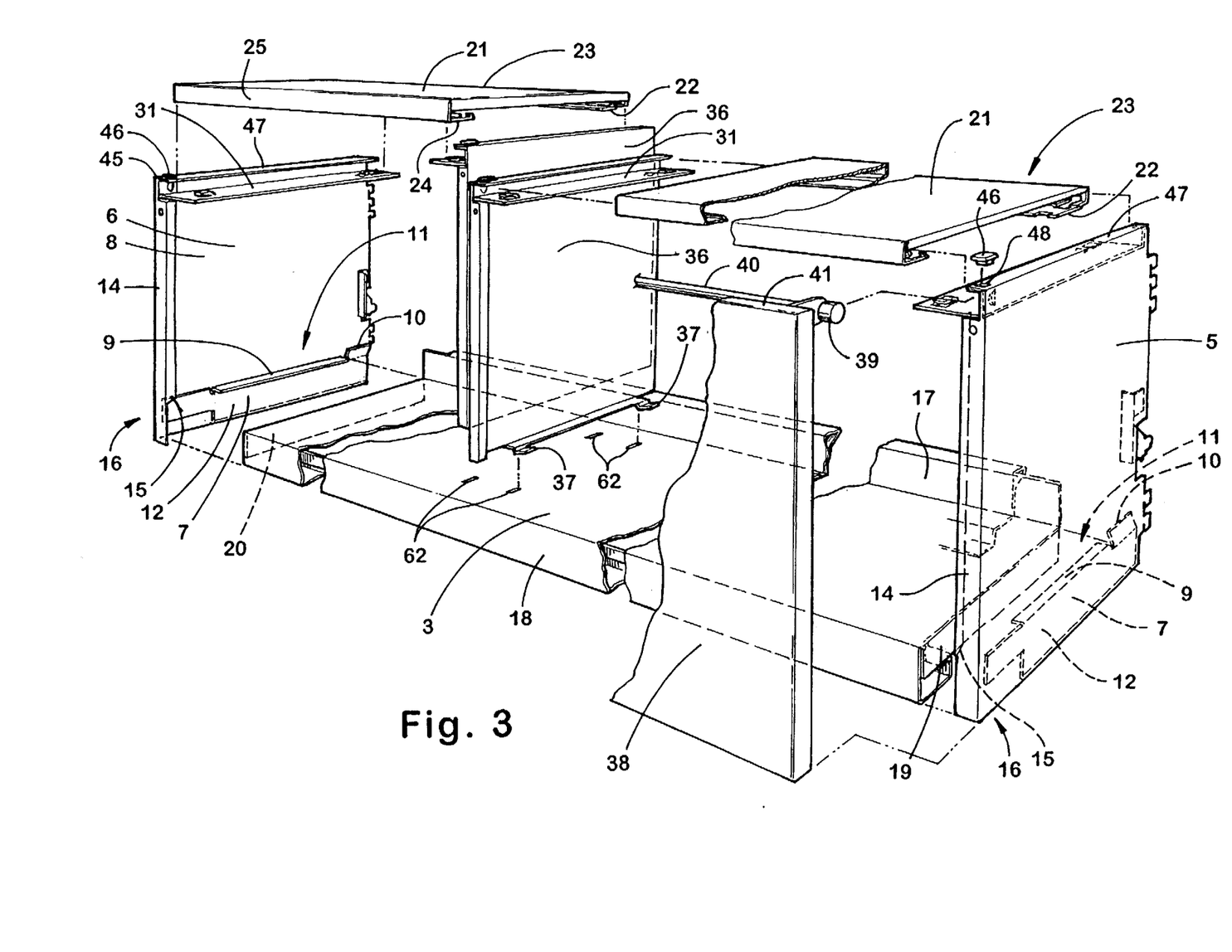
FIG. 3 is an exploded, fragmentary perspective view of the binder bin.
Figure 8:
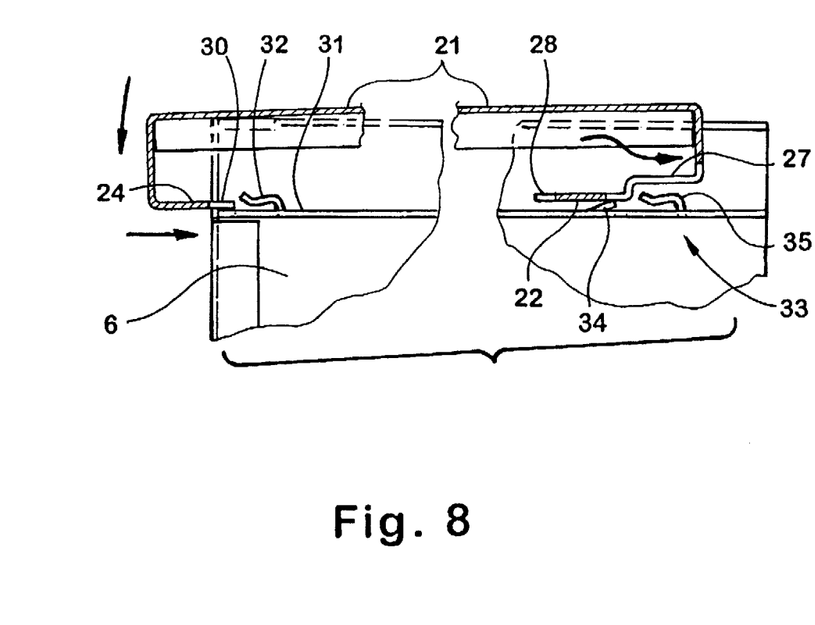
FIG. 8 is a fragmentary, side elevational view showing the cover member during assembly of the storage unit.
Figure 9:
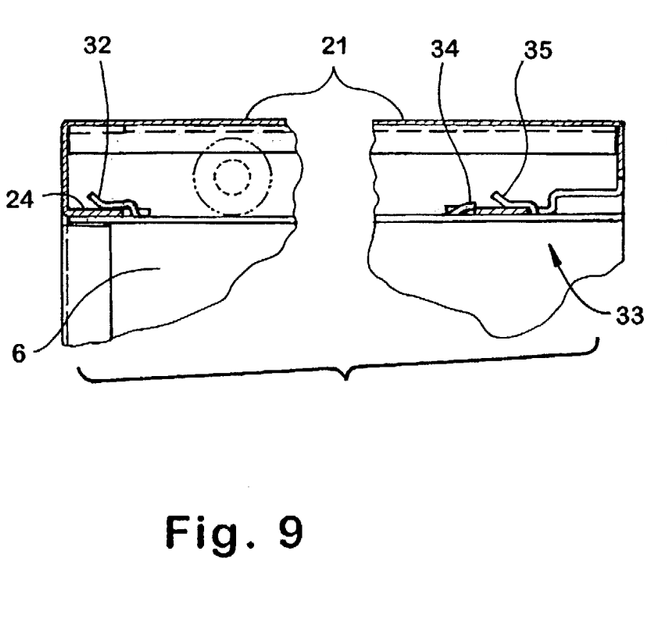
FIG. 9 is a fragmentary, side elevational view showing the cover member during assembly of the storage unit.

The binder bin 2 includes a pair of cover members 21 that define an upper wall of the binder bin 2 (FIGS. 1, 3). The cover member 21 includes a forwardly projecting flange extending along a rear portion 23 of the cover member 21, and a rearwardly projecting flange 24 extending along a forward portion 25 of the cover member 21 (FIG. 7). The forwardly projecting flange 22 includes a vertically offset portion 26 and an aperture 27 having a forward portion 63. A first notch 28 is located along the forward edge of the forwardly projecting flange 22. The rearwardly projecting flange 24 includes an upturned edge 29 and a second notch 30. The first and second end members 5, 6 include inwardly protruding cover support flanges 31 extending generally horizontally along at least a portion thereof to form horizontal door guides. In the illustrated example, a front clasp 32 comprises a tab formed from the sheet metal of the cover support flange 31, and is shaped to engage the second notch 30 of the rearwardly projecting flange 24 when the cover member 21 is shifted rearwardly as illustrated in FIGS. 8 and 9. A rear clasp 33 comprises a small rearwardly opening lock tab 34 and a forwardly opening tab 35. As illustrated in FIGS. 8 and 9, as the cover member 21 is shifted rearwardly while being abuttingly supported on the cover support flange 31, the rear flange 22 engages the rear clasp 33. The forwardly opening tab 35 engages the forward portion 63 of the aperture 27, and the lock tab 34 engages the first notch 28, thereby vertically capturing the rear portion of the cover member 21 and preventing forward or rearward movement of the cover member 21. The cover member 21 may be removed by bending the lock tab 34 downward and shifting the cover member forward to disengage the clasps 32 and 33.

As illustrated in FIG. 3, the binder bin 2 includes a pair of divider members 36 that have horizontal shelf support tabs 37 that engage apertures 62 that are located at an intermediate position of the shelf member 3. Each of the divider members 36 includes an inwardly protruding cover support flange 31 with front and rear clasps 32 and 33 that are the same as the front and rear clasps of the first and second end members 5, 6.

Figure 10:
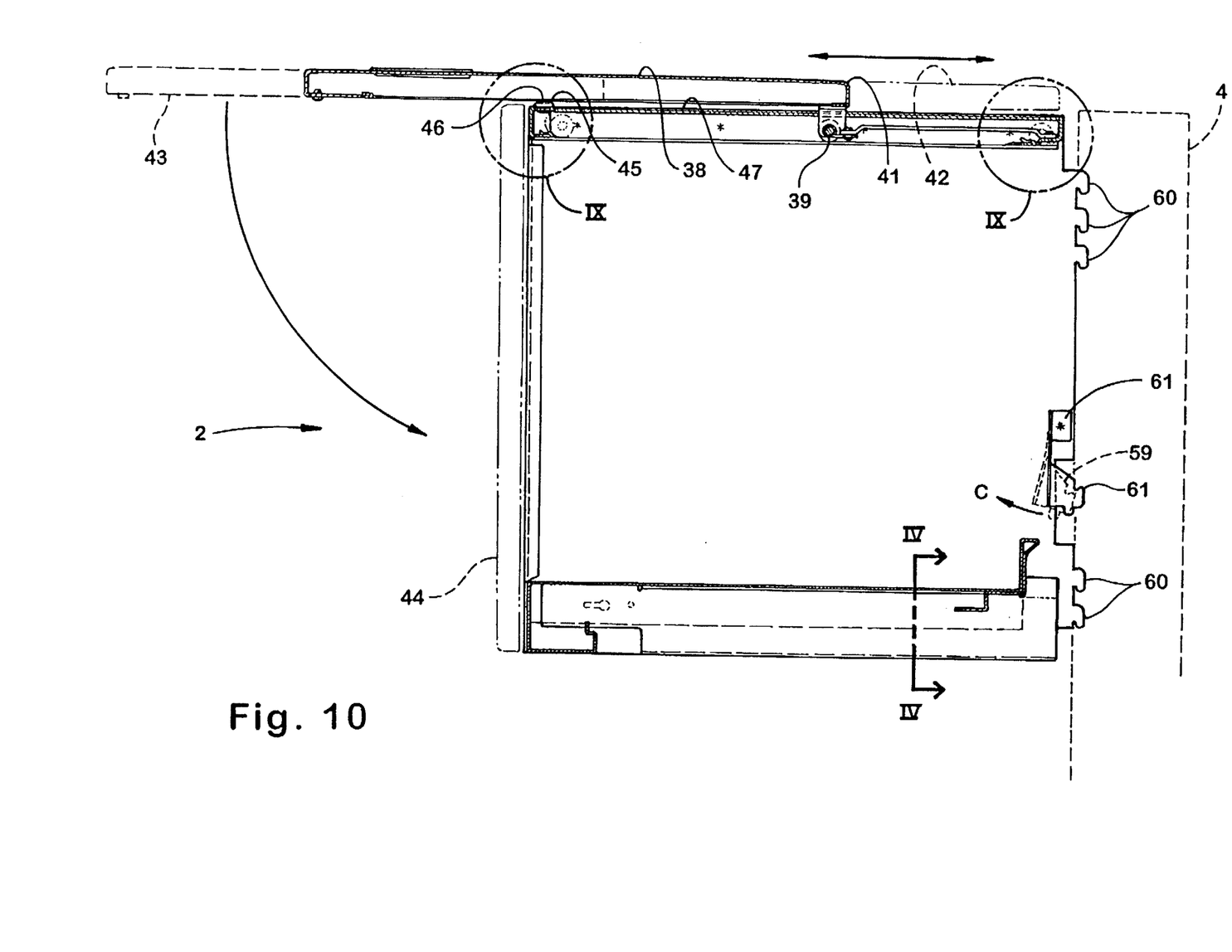
FIG. 10 is a side elevational view of the binder bin showing the operation of the door.

As best seen in FIGS. 3 and 10, the binder bin 2 includes a pair of door members 38, each of which has a pair of rollers 39 rotatably mounted to an axle 40 that is mounted near the upper edge 41 of the door member 38. The rollers 39 are slidably supported on the cover support flange 31, which acts as a door guide for shifting the door member 38 between a forward horizontal position 43, and a rearward horizontal position 42 (FIG. 10). The door member 38 may be pivoted from the open, forward horizontal position 43 to a closed vertical position 44. A stop 45 is formed in the end members 5 and 6, and prevents the door member 38 from moving forward beyond the forward horizontal position 43. A plug member 46 is made from a polymeric material, and is inserted into an aperture 48 in the upper edge of flange 47 of the end members 5 and 6. The door member 38 rests on the plug member 46 along a side edge, such that the door member 38 is prevented from rotating downward to the closed vertical position 44 unless the door member 38 is in the forward horizontal position 43 with the rollers 39 against the stop 45. This feature prevents inadvertent closing of the door member 38 due to a weight being placed on the door when the door is in a position intermediate the forward and rearward horizontal positions 42 and 43.

Figure 11:
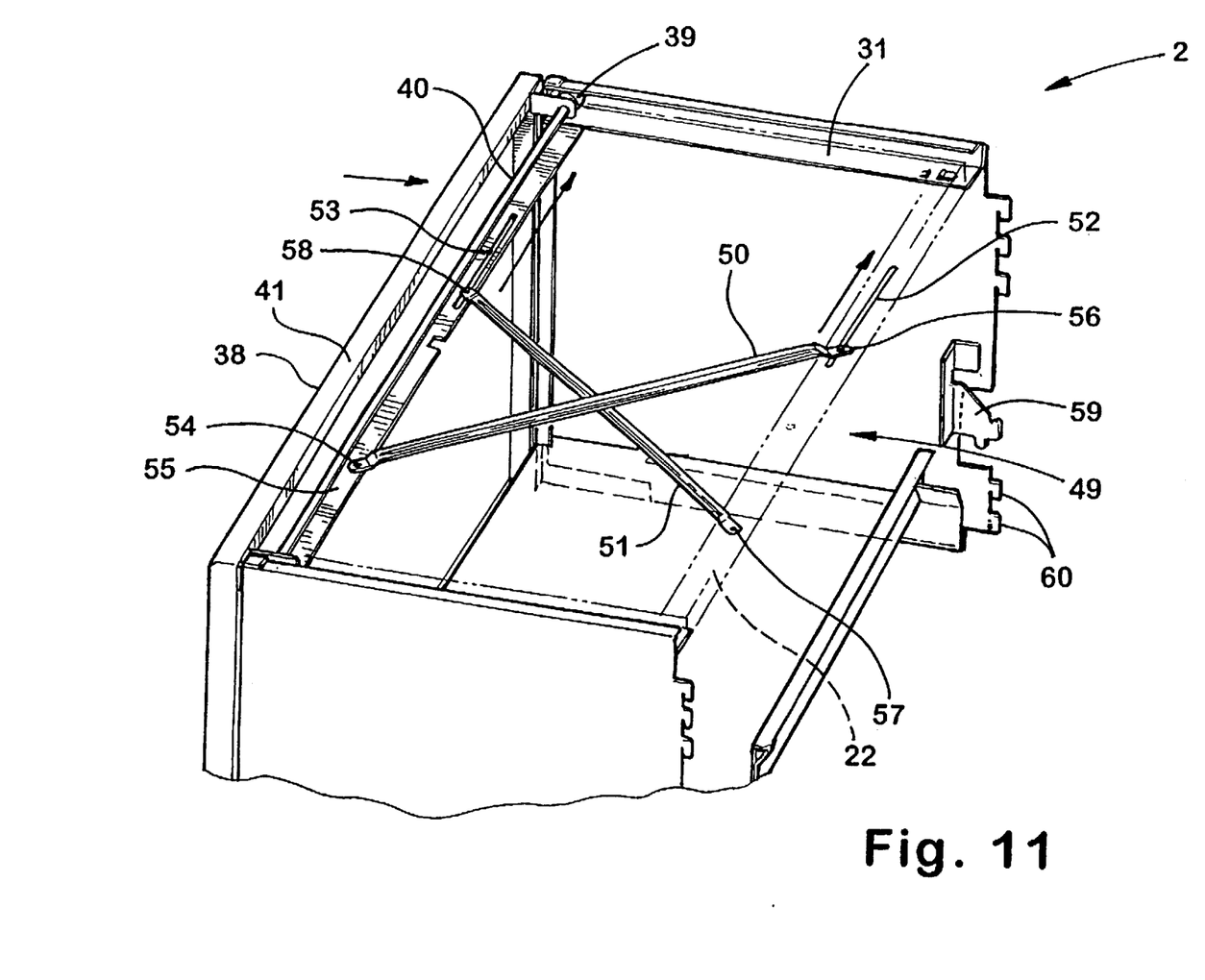
FIG. 11 is a fragmentary, perspective view of the binder bin showing the equalizer mechanism.

As illustrated in FIG. 11, the binder bin 2 includes a door equalizer mechanism 49 that includes a pair of elongate alignment members 50 and 51. The door member 38 includes a horizontal guide member 55 which is rotatably mounted to the axle 40 and maintains a horizontal orientation regardless of the position of the door 38. A first end 54 of a first alignment member 50 is pivotably attached to the horizontal guide member 55, and the second end 56 is slidably engaged with a guide slot or elongate slide 52 in the forwardly projecting rear flange 22 of the cover member 21. A first end 57 of the second elongate alignment member 51 is pivotably attached to the forwardly projecting rear flange 22 of the cover member 21, and a second end 58 is slidably engaged with a guide slot or elongate slide 53 formed in the horizontal guide member 55. The equalizer mechanism constrains the door during shifting between the forward horizontal position 43 and the rearward horizontal position 42 such that the door slides in a smooth manner without the jamming or racking problems encountered with gear-type equalizer mechanisms.

With reference to FIGS. 2 and 10, the binder bin 2 and the shelf member 3 include rearwardly protruding hooks 60 that are configured to be received within slotted uprights 4 to detachably mount the end members 5 and 6 on an associated partition. A catch 59 is formed from spring steel and is welded to the end members 5 and 6 at 61. During installation of the storage unit onto the slotted upright, the catch 59 flexes in the direction indicated by the arrow "C" until the storage unit is shifted downward to engage the hooks 60 into the slots. When the slots 60 are in the fully engaged position, the catch 59 flexes in the direction opposite the arrow "C", thereby engaging the upper notch 61 into the top edge of the slot. Removal of the storage unit requires that the catch 59 be manually flexed in the direction of the arrow "C", and the storage unit shifted upward and then out of the slots. The storage unit cannot be removed without manually flexing the catch 59, thereby eliminating the possibility of accidental dislodgement from the slotted upright.

The binder bin 2 and shelf member 3 are assembled by engaging the end members 5 and 6 into a slotted upright 4 of a partition panel. As illustrated in FIGS. 5 and 6, the first and second attachment flanges 19 and 20 of the shelf member 3 are then inserted into the vertical slots 13 formed by the vertical support legs 12 located along the lower edge of the end support members 5 and 6. The shelf member 3 is initially positioned at an approximate 30 degree angle with the front edge being lower than the rear edge as the attachment flanges 19 and 20 are inserted into the vertical slots 13. After the forward edge 18 of the shelf 3 is shifted downward, the shelf 3 is then shifted forward in the direction of the arrow "A" shown in FIG. 6, thereby positioning the forward edge 18 of the shelf member 3 in the notches 15 of the end member forward edges 14. The rear portion of the shelf 17 is then shifted downward in the direction indicated by the arrow "B" of FIG. 6 until the shelf member rests on the support legs 9 (FIG. 4). In this position, the front edge of the shelf is prevented from vertical movement by the rearwardly opening notches 15 located at the lower end of the formed forward edges 14 of the end members 5 and 6. In addition, the shelf 3 is restrained from movement in a horizontal direction by the upstanding tabs 10 which are immediately adjacent the upstanding rear portion 17 of the shelf member 3. Removal of the shelf member requires that the rear of the shelf be shifted upwards in a direction opposite the arrow "B" illustrated in FIG. 6. The shelf must then be shifted rearward in the direction opposite the arrow "A" and shifted upwards and out of the vertical slots 13.

To complete assembly of the binder bin 2, the horizontal shelf support tabs 37 of the divider members 36 are inserted into the apertures 62 of the shelf member 3. The door 38 is then installed by placing the rollers 39 on the cover support flanges 31 with the door 38 in the closed vertical position 44. The cover member 21 is then placed on the cover flanges 31 and shifted rearwardly to engage the front and rear clasps 32 and 33 as illustrated in FIGS. 7-9.

The knock-down storage unit of the present invention is not only easily and quickly assembled without the use of tools or separate fasteners, but also may be removed from a slotted upright without disassembling the storage unit. In addition, the storage unit may be readily fabricated from sheet metal to provide a simple yet sturdy storage unit that may be shipped in a disassembled condition and assembled at the installation site.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A knock-down hang-on storage unit for portable partition systems, comprising:

first and second end members configured to be detachably mounted on an associated partition in a laterally spaced apart relationship to define opposite sidewalls of said storage unit; said first and second end members including shelf support flanges extending along interior sides thereof, and having inwardly protruding horizontal support legs extending along at least a portion of said end member interior sides to upstanding tabs adjacent rear areas of said horizontal support legs, and vertical support legs extending along at least a portion of said end member interior sides and defining narrow vertical slots therebetween; said first and second end members also including formed forward edges extending generally vertically along at least a portion thereof with rearwardly opening notches disposed adjacent lower portions of said forward edges;

a shelf member extending generally horizontally between said first and second end members to define a bottom wall of said storage unit; said shelf member including an upstanding rear portion, a formed front edge extending along a forward portion of said shelf member, and first and second depending attachment flanges extending along opposite sides thereof; and wherein said shelf member is shaped to be closely received between said end members, and is configured such that during assembly of said storage unit, said attachment flanges are inserted into said slots, whereby forward shifting of said shelf member positions the front edge of said shelf member in the notches of said end member forward edges to vertically capture the forward portion of said shelf member, and downward shifting of the rear portion of said shelf member positions the opposite sides of said shelf member into abutting support on said horizontal support legs, and locates said upstanding rear portion thereof immediately adjacent said upstanding tabs on said shelf support flanges to horizontally capture said shelf member between said end members, and thereby provide a fastenerless interconnection therebetween.

2. A knock-down hang-on storage unit for portable partition systems as set forth in claim 1, wherein:

said first and second depending attachment flanges extend downwardly along side edges of said shelf member.

3. A knock-down hang-on storage unit for portable partition systems as set forth in claim 2, wherein:

said upstanding tabs extend upwardly and inwardly at an angle from said vertical support legs.

4. A knock-down hang-on storage unit for portable partition systems as set forth in claim 3, wherein:

said upstanding rear portion of said shelf member comprises an upwardly extending flange to horizontally capture said shelf member.

5. A knock-down hang-on storage unit for portable partition systems as set forth in claim 1, wherein:

said first and second end members include inwardly protruding cover support flanges extending generally horizontally along at least a portion thereof with front clasp members and rear clasp members disposed adjacent opposite ends of said cover support flanges, said storage unit further comprising:

a cover member extending generally horizontally between said first and second members along upper portions thereof to define an upper wall of said storage unit, said cover member being removably attached to said front and rear clasp members.

6. A knock-down hang-on storage unit for portable partition systems as set forth in claim 5, including:

a door pivotable between a vertical closed position and a horizontal open forward position wherein said door is shiftable to a horizontal rearward position.

7. A knock-down hang-on storage unit for portable partition systems as set forth in claim 6, wherein:

said first and second end members define an upper edge and include horizontal door guides located adjacent said upper edge;

said door including rollers that operably engage said guides for shifting between said forward position and said rearward position.

8. A knock-down hang-on storage unit for portable partition systems as set forth in claim 7, wherein:

said horizontal door guides are formed by said cover support flanges.

9. A knock-down hang-on storage unit for portable partition systems as set forth in claim 8, wherein:

said storage unit includes a door equalizer mechanism comprising a pair of elongate alignment members; and wherein:

said door and said cover member include first and second elongate slides, respectively;

a first end of one of said alignment members is pivotably attached to said cover member, a second end slidably engaging said first elongate slide; and a first end of the other of said alignment members is pivotably attached to said door, a second end slidably engaging said second elongate side, said equalizer mechanism constraining said door for sliding along said door guides in a smooth manner without jamming or racking.

10. A knock-down hang-on storage unit for portable partition systems as set forth in claim 9, wherein:

said first elongate slide comprises a first linear elongate slot in a horizontal guide member of said door; and said second elongate slide comprises a second linear, elongate slot in forwardly projecting flange of said cover member.

11. A knock-down hang-on storage unit for portable partition systems as set forth in claim 5, wherein:

said cover member includes a forwardly projecting rear flange and a rearwardly projecting forward flange, said cover member configured such that during assembly of said storage unit, rearward shifting of said cover member with opposite sides thereof abuttingly supported on said cover support flanges, causes said rear flange to engage said rear clasp members on said end members to vertically capture the rear portion of said cover member, and also shifts the forward flange of said cover member into engagement with said front clasp members on said end members to vertically capture the forward portion of said cover member and thereby provide a fastenerless interconnection therebetween.

12. A knock-down hang-on storage unit for portable partition systems as set forth in claim 5, further comprising:

a divider member removably attached to said shelf member at an intermediate portion thereof to define a pair of storage spaces having a side-by-side relationship.

13. A knock-down hang-on storage unit for portable partition systems as set forth in claim 12, wherein:

said shelf member includes at least one aperture adjacent said intermediate portion; and said divider member includes a support tab that engages said aperture to removably attach said shelf member to said divider member.

14. A knock-down hang-on storage unit for portable partition systems as set forth in claim 13, wherein said cover member comprises a first cover member, said storage unit further comprising:

a second cover member substantially identical to said first cover member;

a first door member;

a second door member substantially identical to said first door member; and wherein:

said divider member includes inwardly protruding cover support flanges extending generally horizontally along at least a portion thereof with front clasp members and rear clasp members disposed adjacent opposite ends of said support flanges, said divider member further including a pair of horizontal door guides located adjacent an upper edge thereof; and each of said door member is pivotable between a vertical closed position and a horizontal open, forward position wherein each of said door member is shiftable to a horizontal rearward position.

15. A knock-down hang-on storage unit for portable partition systems as set forth in claim 14, wherein:

said end members, said divider member, said shelf member, said door members, and said cover members are each formed from sheet metal.

16. A knock-down hang-on storage unit for portable partition systems as set forth in claim 1, wherein:

said first and second end members include at least one rearwardly protruding hook configured to be received within a slotted upright to detachably mount said end members on the associated partition.

17. A knock-down hang-on storage unit for portable partition systems as set forth in claim 16, wherein:

said first and second end members include a catch to prevent accidental dislodgement from the associated partition.

18. A knock-down hang-on storage unit for portable partition systems as set forth in claim 17, wherein:

said storage unit may be removed from the associated partition when in an assembled condition.

19. A knock-down hang-on storage unit for portable partition systems as set forth in claim 17, wherein:

said catches are formed from spring steel and flex to allow engagement of said hooks with the associated partition, said catches being manually flexed for removal of said storage unit from the associated partition.

20. A knock-down hang-on storage unit for portable partition systems and the like, comprising:

first and second end members configured to be detachably mounted on an associated partition in a laterally spaced apart relationship to define opposite sidewalls of said storage unit; said first and second end members including inwardly protruding cover support flanges extending generally horizontally along at least a portion thereof with front clasp members and rear clasp members disposed adjacent opposite ends of said cover support flanges;

a shelf member extending generally horizontally between said first and second end members along lower portions thereof to define a bottom wall of said storage unit;

a cover member extending generally horizontally between said first and second end members along upper portions thereof to define an upper wall of said storage unit; said cover member including a forwardly projecting rear flange extending along a rear portion of said cover member, and a rearwardly projecting forward flange extending along a forward portion of said cover member; and wherein said cover member is shaped to be closely received between said end members, and is configured such that during assembly of said storage unit, rearward shifting of said cover member with opposite sides thereof abuttingly supported on said cover support flanges, causes said rear flange to engage said rear clasp members on said end members to vertically capture the rear portion of said cover member, and also shifts the forward flange of said cover member into engagement with said front clasp members on said end members to vertically capture the forward portion of said cover member and thereby provide a fastenerless interconnection therebetween.

21. A knock-down hang-on storage unit for portable partition systems as set forth in claim 20, wherein:

said front clasp members and said rear clasp members each include forwardly opening tabs.

22. A knock-down hang-on storage unit for portable partition systems as set forth in claim 21, wherein:

said rear clasps each include a rearwardly opening lock tab.

23. A knock-down hang-on storage unit for portable partition systems as set forth in claim 22, wherein:

said forwardly projecting rear flange has a forward edge including a first pair of notches, said forwardly projecting rear flange also having a vertically offset portion that is spaced rearwardly from said forward edge, said vertically offset portion including a pair of apertures, each defining a forward portion, such that rearward shifting of said cover member during assembly engages said first pair of notches with said lock tabs and engages said forward portion of said apertures with said forwardly opening tabs of said rear clasp members.

24. A knock-down hang-on storage unit for portable partition systems as set forth in claim 23, wherein:
said rearwardly projecting forward flange has a rearward edge with a pair of notches that engage said forwardly opening tabs of said front clasps upon rearward shifting of said cover member during assembly.

25. A knock-down hang-on storage unit for portable partition systems as set forth in claim 24, further comprising:
a door member that is pivotable between a vertical closed position and a horizontal open position, said door member being slidable to a forward position, and to a horizontal rearward position; and wherein:
said first and second end members define an upper edge and include horizontal door guides located adjacent said upper edge;
said door member including rollers that operably engage said guides for shifting between said forward position and said rearward position.

26. A knock-down hang-on storage unit for portable partition systems as set forth in claim 25, wherein:
said storage unit includes a door equalizer mechanism comprising a pair of elongate alignment members; and wherein:
said door member includes a first elongate slide;
said cover member includes a second elongate slide;
a first end of one of said alignment members is pivotably attached to said cover member, a second end slidably engaging said first elongate slide; and
a first end of the other of said alignment members is pivotably attached to said door member, a second end slidably engaging said second elongate side, said equalizer mechanism constraining said door member for sliding along said door guides in a smooth manner without jamming or racking.

27. A knock-down hang-on storage unit for portable partition systems as set forth in claim 26, wherein:
said first and second end members include at least one rearwardly protruding hook configured to be received within a slotted upright to detachably mount said end members on the associated partition and a catch to prevent accidental dislodgement therefrom;
said storage unit being removable from the associated partition when in an assembled condition.

28. A knock-down hang-on storage unit for portable partition systems as set forth in claim 27, wherein:
said first and second end members include shelf support flanges extending along interior sides thereof, and having inwardly protruding horizontal support legs extending along at least a portion of said end member interior sides to upstanding tabs adjacent rear areas of said horizontal support legs, and vertical support legs extending along at least a portion of said end member interior sides and defining narrow vertical slots therebetween;
said first and second end members also include formed forward edges extending generally vertically along at least a portion thereof with rearwardly opening notches disposed adjacent lower portions of said forward edges;
said shelf member includes an upstanding rear portion, a formed front edge extending along a forward portion of said shelf member, and first and second depending attachment flanges extend along opposite sides thereof; and wherein:
said shelf member is shaped to be closely received between said end members, and is configured such that during assembly of said storage unit, said attachment flanges are inserted into said slots, whereby forward shifting of said shelf member positions the front edge of said shelf member in the notches of said end member forward edges to vertically capture the forward portion of said shelf member, and downward shifting of the rear portion of said shelf member positions the opposite sides of said shelf member into abutting support on said horizontal support legs, and locates said upstanding rear portion thereof immediately adjacent said upstanding tabs on said shelf support flanges to horizontally capture said shelf member between said end members, and thereby provide a fastenerless interconnection therebetween.

29. A knock-down hang-on storage unit for portable partition systems as set forth in claim 28, wherein:
said first and second depending attachment flanges extend downwardly along side edges of said shelf member.

30. A knock-down hang-on storage unit for portable partition systems, comprising:
first and second end members configured to be detachably mounted on the associated partition in a laterally spaced apart relationship to define opposite sidewalls of said storage unit; said first and second end members including shelf support flanges attached to and extending along interior sides thereof, and having inwardly protruding horizontal support legs extending along at least a portion of said end member interior sides to upstanding tabs adjacent rear areas of said horizontal support legs, and vertical support legs extending along at least a portion of said end member interior sides and defining narrow vertical slots therebetween; said first and second end members also including inwardly protruding cover support flanges extending generally horizontally along at least a portion thereof with front clasp members and rear clasp members disposed adjacent opposite ends of said cover support flanges; said first and second end members also including formed forward edges extending generally vertically along at least a portion thereof with rearwardly opening notches disposed adjacent lower portions of said forward edges;
a shelf member extending generally horizontally between said first and second end members to define a bottom wall of said storage unit; said shelf member including an upstanding rear portion, a formed front edge extending along a forward portion of said shelf member, and first and second depending attachment flanges extending along opposite sides thereof;
a cover member extending generally horizontally between said first and second end members along upper portions thereof to define an upper wall of said storage unit; said cover member including a forwardly projecting rear flange extending along a rear portion of said cover member, and a rearwardly projecting forward flange extending along a forward portion of said cover member; and wherein
said shelf member is shaped to be closely received between said end members, and is configured such that during assembly of said storage unit, said attachment flanges are inserted into said slots, whereby forward shifting of said shelf member positions the front edge of said shelf member in the notches of said end member forward edges to vertically capture the forward portion of said shelf member, and downward shifting of the rear portion of said shelf member positions the opposite sides of said shelf member into abutting support on said horizontal support legs, and locates said upstanding rear portion thereof immediately adjacent said upstanding tabs on said shelf support flanges to horizontally capture said shelf member between said end members; and said cover member is shaped to be closely received between said end members, and is configured such that during assembly of said storage unit, rearward shifting of said cover member with opposite sides thereof abuttingly supported on said cover support flanges, causes said rear flange to engage said rear clasp members on said end members to vertically capture said rear portion of said cover member, and also shifts the forward flange of said cover member into engagement with said front clasp members on said end members to vertically capture the forward portion of said cover member and thereby provide said storage unit with a fastenerless construction.

31. A knock-down hang-on storage unit for portable partition systems as set forth in claim 30, wherein:

said front clasp members and said rear clasp members each include a forwardly opening tab.

32. A knock-down hang-on storage unit for portable partition systems as set forth in claim 31, wherein:

said rear clasps each include a rearwardly opening lock tab.

33. A knock-down hang-on storage unit for portable partition systems as set forth in claim 32, wherein:

said forwardly projecting flange has a forward edge including a first pair of notches, said forwardly projecting flange also having a vertically offset portion that is spaced rearwardly from said forward edge, said vertically offset portion including a pair of apertures, each defining a forward portion, such that rearward shifting of said cover member during assembly engages said first pair of notches with said lock tabs and engages said forward portion of said apertures with said forwardly opening tabs of said rear clasp members.

34. A knock-down hang-on storage unit for portable partition systems as set forth in claim 33, wherein:

said rearwardly projecting flange has a rearward edge with a pair of notches that engage said forwardly opening tabs of said front clasps upon rearward shifting of said cover member during assembly.

35. A knock-down hang-on storage unit for portable partition systems as set forth in claim 34, further comprising:

a door member that is pivotable between a vertical closed position and a horizontal open position, said door member being slidable to a forward position, and to a horizontal rearward position; and wherein:

said first and second end members define an upper edge and include horizontal door guides located adjacent said upper edge;

said door member including rollers that operably engage said guides for shifting between said forward position and said rearward position.

36. A knock-down hang-on storage unit for portable partition systems as set forth in claim 35, wherein:

said storage unit includes a door equalizer mechanism comprising a pair of elongate alignment members; and wherein:

said door member and said cover member include first and second elongate slides, respectively;

a first end of one of said alignment members is pivotably attached to said cover member, a second end slidably engaging said first elongate slide; and a first end of the other of said alignment members is pivotably attached to said door member, a second end slidably engaging said second elongate side, said equalizer mechanism constraining said door member for sliding along said door guides in a smooth manner without jamming or racking.

37. A knock-down hang-on storage unit for portable partition systems as set forth in claim 36, wherein:

said first and second end members include at least one rearwardly protruding hook configured to be received within a slotted upright to detachably mount said end members on the associated partition and a catch to prevent accidental dislodgement therefrom;

said storage unit being removable from the associated partition when in an assembled condition.

38. A knock-down hang-on storage unit for portable partition systems as set forth in claim 37, further comprising:

a divider member removably attached to said shelf member at an intermediate portion thereof to define a pair of storage spaces having a side-by-side relationship.

39. A knock-down hang-on storage unit for portable partition systems as set forth in claim 38, wherein said cover member comprises a first cover member, and said door member comprises a first door member, said storage unit further comprising:

a second cover member substantially identical to said first cover member;

a second door member substantially identical to said first door member; and wherein:

said divider member includes inwardly protruding cover support flanges extending generally horizontally along at least a portion thereof with front clasp members and rear clasp members disposed adjacent opposite ends of said support flanges, said divider member further including a pair of horizontal door guides located adjacent an upper edge thereof; and said second door member is pivotable between a vertical closed position and a horizontal open, forward position, said second door member shiftable to a horizontal rearward position from said forward position.

40. In a portable partition system of the type having rigid, slotted vertical uprights configured to support hang-on accessories thereon, the improvement of a knock-down storage unit, comprising:

first and second end members with rearwardly protruding hooks configured to be receive within said slotted uprights to detachably mount said end members on the associated partition in a laterally spaced apart relationship to define opposite sidewalls of said storage unit, said first and second end members defining interior sides thereof and including vertical support legs extending along at least a portion of said end member interior sides and defining narrow vertical slots therebetween;

a shelf member including first and second depending attachment flanges extending along opposite sides thereof, said shelf member extending generally horizontally between said first and second end members along lower portions thereof to define a bottom wall of said storage unit;

a cover member extending generally horizontally between said first and second end members along upper portions thereof to define an upper wall of said storage unit; and connectors detachably connecting said cover member with said end members by sliding engagement therebetween, and wherein said shelf member is shaped to be closely received between said end members, and is configured such that during assembly of said storage unit, said attachment flanges are inserted into said slots to form a rigid construction for said storage unit which can be removed from a selected one of said slotted vertical uprights and remounted on different ones of said slotted vertical uprights without disassembling said storage unit.

41. A knock-down storage unit as set forth in claim 40, wherein:

said first and second end members include shelf support flanges attached to and extending along interior sides thereof, and have inwardly protruding horizontal support legs extending along at least a portion of said end member interior sides to upstanding tabs adjacent rear areas of said horizontal support legs, said first and second end members also including formed forward edges extending generally vertically along at least a portion thereof with rearwardly opening notches disposed adjacent lower portions of said forward edges;

said shelf member including an upstanding rear portion, a formed front edge extending along a forward portion of said shelf member; and wherein forward shifting of said shelf member during assembly of said storage unit positions the front edge of said shelf member in the notches of said end member forward edges to vertically capture the forward portion of said shelf member, and downward shifting of the rear portion of said shelf member positions the opposite sides of said shelf member into abutting support on said horizontal support legs, and locates said upstanding rear portion thereof immediately adjacent said upstanding tabs on said shelf support flanges to horizontally capture said shelf member between said end members, and thereby provide a fastenerless interconnection therebetween.

42. A knock-down storage unit as set forth in claim 41, wherein:

said first and second end members include inwardly protruding cover support flanges extending generally horizontally along at least a portion thereof with front clasp members and rear clasp members disposed adjacent opposite ends of said cover support flanges;

said cover member includes a forwardly projecting rear flange extending along a rear portion of said cover member, and a rearwardly projecting forward flange extending along a forward portion of said cover member; and wherein said cover member is shaped to be closely received between said end members, and is configured such that during assembly of said storage unit, rearward shifting of said cover member with opposite sides thereof abuttingly supported on said cover support flanges, causes said rear flange to engage said rear clasp members on said end members to vertically capture the rear portion of said cover member, and also shifts the forward flange of said cover member into engagement with said front clasp members on said end members to vertically capture the forward portion of said cover member and thereby provide a fastenerless interconnection therebetween.

43. A knock-down hang-on storage unit for portable partition systems as set forth in claim 42, wherein:

said front clasp members and said rear clasp members each include a forwardly opening tab.

44. A knock-down hang-on storage unit for portable partition systems as set forth in claim 43, wherein:

said rear clasps each include a rearwardly opening lock tab.

45. A knock-down hang-on storage unit for portable partition systems as set forth in claim 44, wherein:

said forwardly projecting flange has a forward edge including a first pair of notches, said forwardly projecting flange also having a vertically offset portion that is spaced rearwardly from said forward edge, said vertically offset portion including a pair of apertures, each defining a forward portion, such that rearward shifting of said cover member during assembly engages said first pair of notches with said lock tabs and engages said forward portion of said apertures with said forwardly opening tabs of said rear clasp members.

46. A knock-down hang-on storage unit for portable partition systems as set forth in claim 45, wherein:

said rearwardly projecting flange has a rearward edge with a pair of notches that engage said forwardly opening tabs of said front clasps upon rearward shifting of said cover member during assembly.

47. A knock-down hang-on storage unit for portable partition systems as set forth in claim 46, further comprising:

a door member that is pivotable between a vertical closed position and a horizontal open position, said door being slidable to a forward position, and to a horizontal rearward position; and wherein:

said first and second end members define an upper edge and include horizontal door guides located adjacent said upper edge;

said door member including rollers that operably engage said guides for shifting between said forward position and said rearward position.

* * * * *

UNITED STATES PATENT AND TRADEMARK OFFICE
CERTIFICATE OF CORRECTION

PATENT NO.    :  5,893,616
DATED         :  April 13, 1999
INVENTOR(S)   :  MacDonald et al.

It is certified that error appears in the above-identified patent and that said Letters Patent is hereby corrected as shown below:

Col. 9, claim 10, line 4;
    After "in" insert --a--;

Col. 14, claim 40, line 47;
    "receive" should be --received--;

Col. 14, claim 40, line 48;
    "the" should be --an--.

Signed and Sealed this

Sixteenth Day of November, 1999

*Attest:*

Q. TODD DICKINSON

*Attesting Officer*    *Acting Commissioner of Patents and Trademarks*